(12) United States Patent
Kim (10) Patent No.: US 7,734,702 B2
(45) Date of Patent: Jun. 8, 2010

(54) CONTENT UPDATE FEATURE FOR AN INSTANT MESSAGING SERVICE

(75) Inventor: Byung-Soo Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 508 days.

(21) Appl. No.: 11/327,534

(22) Filed: Jan. 5, 2006

(65) Prior Publication Data
US 2006/0149825 A1    Jul. 6, 2006

(30) Foreign Application Priority Data
Jan. 6, 2005    (KR)    ............. 10-2005-0001259

(51) Int. Cl.
*G06F 15/16* (2006.01)
(52) U.S. Cl. ............... 709/206; 709/220; 709/246
(58) Field of Classification Search .......... 709/203, 709/206, 220, 246
See application file for complete search history.

(56) References Cited

U.S. PATENT DOCUMENTS

| | | | | |
|---|---|---|---|---|
| 6,961,939 | B2 * | 11/2005 | Anderson et al. | 719/316 |
| 6,978,315 | B1 * | 12/2005 | Burrell | 709/246 |
| 7,111,062 | B2 * | 9/2006 | Banerjee et al. | 709/224 |
| 7,185,057 | B2 * | 2/2007 | Brown et al. | 709/206 |
| 7,185,285 | B2 * | 2/2007 | Van Dok et al. | 715/753 |
| 7,257,617 | B2 * | 8/2007 | Brown et al. | 709/204 |
| 7,277,957 | B2 * | 10/2007 | Rowley et al. | 709/231 |
| 7,296,080 | B2 * | 11/2007 | Rowley et al. | 709/231 |
| 7,305,627 | B2 * | 12/2007 | Tannenbaum | 715/751 |
| 7,324,826 | B2 * | 1/2008 | Carey et al. | 455/466 |
| 7,428,702 | B1 * | 9/2008 | Cervantes et al. | 715/255 |
| 7,543,033 | B2 * | 6/2009 | Vincent | 709/206 |
| 2003/0023689 | A1 * | 1/2003 | Brown et al. | 709/206 |
| 2006/0161631 | A1 * | 7/2006 | Lira | 709/206 |
| 2007/0124387 | A1 * | 5/2007 | Galloway | 709/206 |

* cited by examiner

*Primary Examiner*—Rupal D Dharia
*Assistant Examiner*—Van Kim T Nguyen
(74) *Attorney, Agent, or Firm*—Lee, Hong, Degerman, Kang & Waimey (57) ABSTRACT

A first mobile terminal comprising a screen configured to display a first window for displaying messages communicated between the first terminal and a second terminal; a user interface, wherein a user may interact with the user interface to update content in a first message displayed in the first window, wherein the first message is previously communicated to and displayed on the second terminal; a processor for detecting updated information and constructing an update packet comprising information about the updated information; and a transmitter for transmitting the update packet to the second terminal to cause a corresponding content update in the first message previously displayed on the second terminal.

10 Claims, 8 Drawing Sheets

CONTENT UPDATE FEATURE FOR AN INSTANT MESSAGING SERVICE

CROSS REFERENCE TO RELATED APPLICATIONS

Pursuant to 35 U.S.C. §119(a), this application claims the benefit of earlier filing date and right of priority to Korean Patent Application No. 10-2005-0001259, filed on Jan. 6, 2005, the content of which is hereby incorporated by reference herein in its entirety.

FIELD OF INVENTION

The invention relates to a mobile terminal, and more particularly to a method for enhancing instant messaging service in a mobile terminal capable of correcting a typing error with ease.

BACKGROUND

Instant messaging refers to exchanging messages in real-time between two or more communication terminals. Popular instant messaging services are provided by Microsoft™, ICQ™, AOL™ and Yahoo™.

Unlike a dial-up system such as the telephone, instant messaging requires that both parties be logged onto the instant messaging service at the same time. Also known as "chatting," instant messaging has become very popular for both business and personal use. E-mail and instant messaging are often used in a similar manner, but e-mail is not real-time.

Instant messaging service is also used in mobile communication terminals. For example, an instant messaging service such as MSN messenger of Microsoft Corporation and Nateon™ of SK Communications may be implemented over a wireless communication platform, so that a user will have access to the instant messaging service where wireless service is available.

Figure 1:
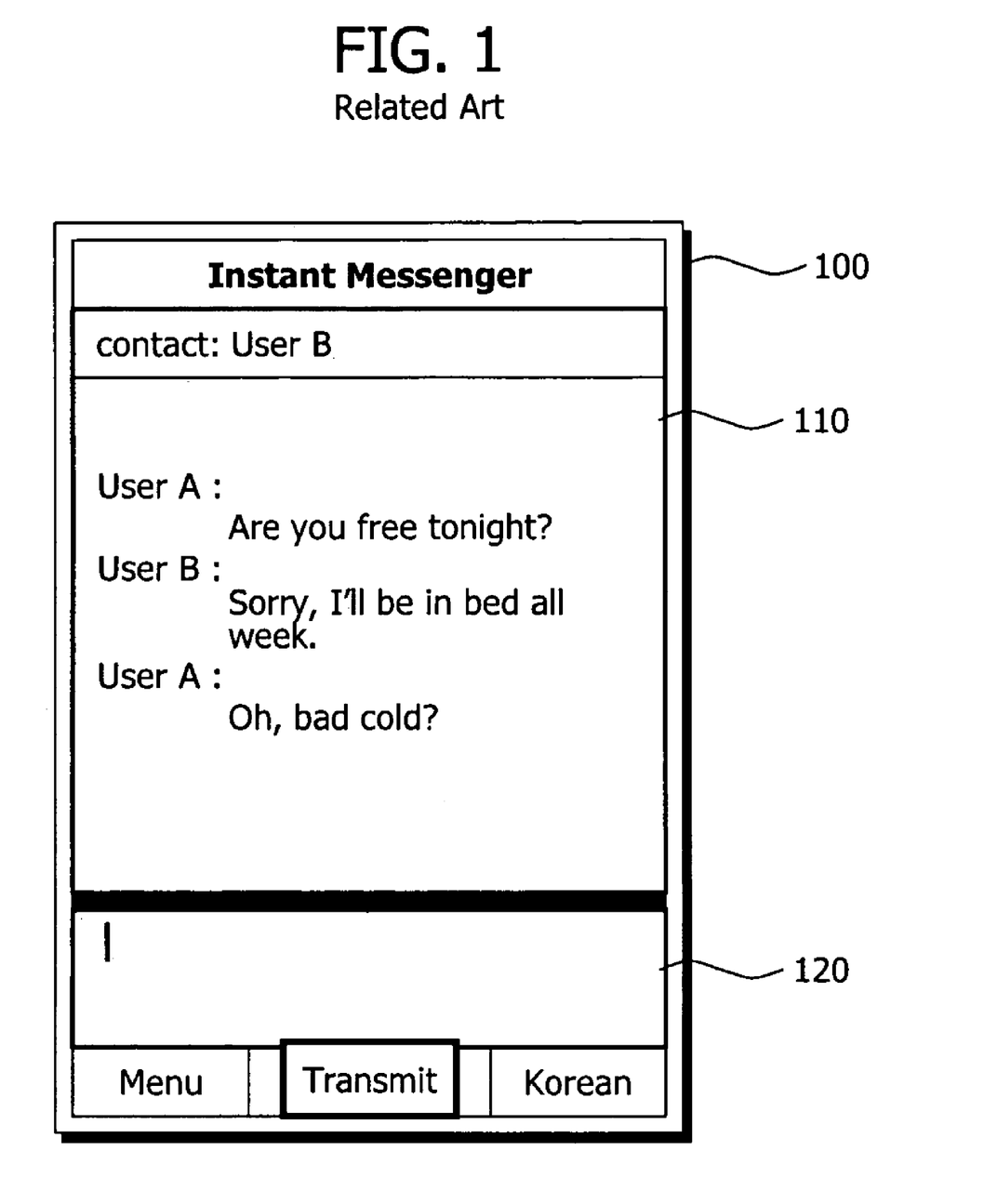
FIG. 1 is a view showing an usage screen of instant messaging service in a mobile terminal.

FIG. 1 shows a usage screen of an instant messaging service in a mobile terminal. The instant messaging service usage screen 100 displayed on a display unit of the mobile terminal is divided into a viewing window 110 for displaying text messages communicated between the users, and an input window 120 for displaying messages the users input.

If a user A (e.g., a transmitting party) inputs message data by using a keypad and clicks a button to send the message, the message inputted by the user A is displayed on the viewing window 110 of a user A's mobile terminal. The inputted message is transmitted in a packet form, and is displayed on a user B's (i.e., a receiving party's) mobile terminal.

Unfortunately, due to the small keyboard sizes in mobile terminals, spelling mistakes are frequent when entering text data. The current instant messaging devices and services do not handle spelling errors and therefore a user will sometimes have to rewrite the entire message if it contains a single mistake. This wastes the user's time and resources.

A solution to the above problem is needed.

SUMMARY OF THE INVENTION

To achieve these and other advantages and in accordance with the purpose of the present invention, as embodied and broadly described herein, there is provided a method for enhancing instant messaging service in a mobile terminal. The method comprises selecting a first content displayed in a first location in a viewing window of a first terminal, wherein the first content is in a first message communicated between the first terminal and a second terminal over an instant messaging service; and updating the first content to a second content in the first location within the viewing window of the first terminal, without interacting with an edit window of the first terminal; wherein in response to updating the first content, the second content is displayed on a viewing window of the second terminal.

In one embodiment, prior to the updating process, the first content is displayed in a first location in the viewing window of the second terminal, and after the updating process, the second content is displayed in the first location in the viewing window of the second terminal.

The first terminal transmits to the second terminal data about location of the first terminal to the second terminal data about location of the first content in the first message, data about display attributes of the first content in the viewing window of the second terminal. The first content comprises an alphanumeric character in a text message communicated between the first and second terminals, in accordance with one embodiment.

In another embodiment, first content comprises an image in a message communicated between the first and second terminals, or multimedia data. A packet comprising update information may be constructed in response to the process of updating the first content to the second content, wherein the packet comprises information associated with at least one of a location of the second content of the viewing window of the second terminal, an attribute of the second content, and value of the second content.

In a preferred embodiment, an information update method in an instant messaging communication network comprises displaying on a viewing window of a second terminal, a first message communicated between a first terminal and the second terminal over an instant messaging service; updating a first content in the first message to a second content, in response to receiving an update data packet from the first terminal, wherein the update packet comprises the second content; and information about location of the first content within the first message.

The update packet may further comprise information about display attributes of the second content at least one of the display attributes of the second content may be different from display attributes of the first content. The first content in the first message is updated in response to a user interacting with a viewing window of the first terminal, wherein the user does not interact with the editing window of the first terminal. In one embodiment, information about the location of the first content is provided in form of $n^{th}$ byte within $n^{th}$ message communicated between the first and second terminals.

An update communication packet in accordance with another aspect of the invention comprises a data portion comprising second content to replace first content in a first message communicated between the first terminal and the second terminal; and a correction information data portion for providing location information of the first content in the first message; wherein the first content is replaced with the second content in accordance with the location information, in response to a user interaction with a viewing window of the first terminal.

The update communication packet may further comprise an attribute data portion for providing attribute information for the second content, and a header unit for identifying the update communication packet as a communication packet comprising update information for a previously transmitted message.

A first mobile terminal in accordance with another embodiment comprises a screen configured to display a first window for displaying messages communicated between the first terminal and a second terminal; a user interface, wherein a user may interact with the user interface to update content in a first message displayed in the first window, wherein the first message is previously communicated to and displayed on the second terminal; a processor for detecting updated information and constructing an update packet comprising information about the updated information; and a transmitter for transmitting the update packet to the second terminal to cause a corresponding content update in the first message previously displayed on the second terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

Reference will now be made in detail to the preferred embodiments of the present invention, examples of which are illustrated in the accompanying drawings.

Figure 2:
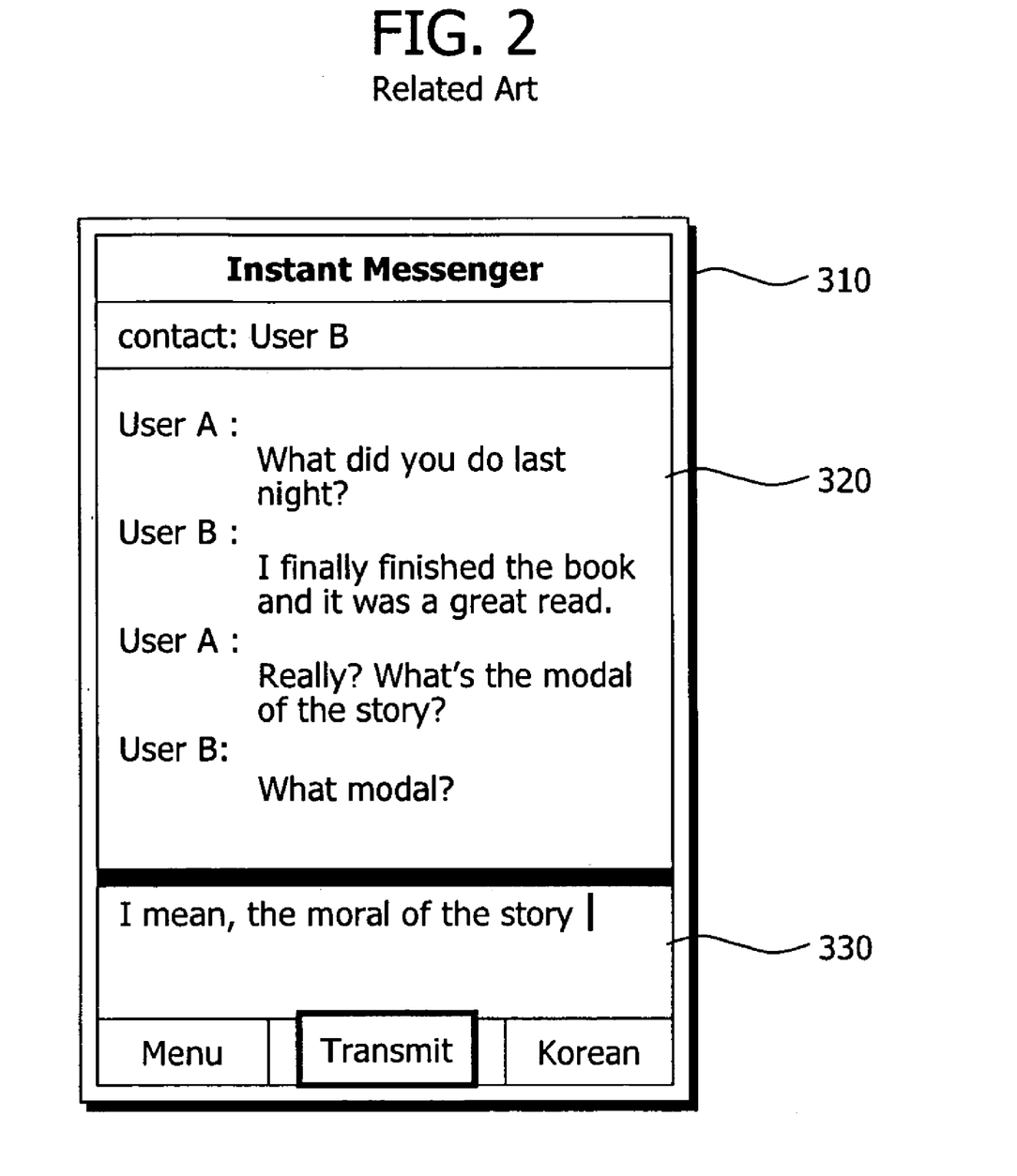
FIG. 2 is a view showing a typing error in a message communicated in an instant messaging service for a mobile terminal.

With reference to FIG. 2, by way of example, when using an instant messenger service, a user A has mistakenly inputted "What's the modal of the story?" instead of "What's the moral of the story?" and transmitted the erroneous content to a user B. Then, since the user B did not understand the user A, the user A corrected the typing error and retransmitted the communicated message. That is, since as shown in FIG. 2, an erroneous message previously transmitted cannot be corrected, a new message should be written and transmitted.

Figure 3A:
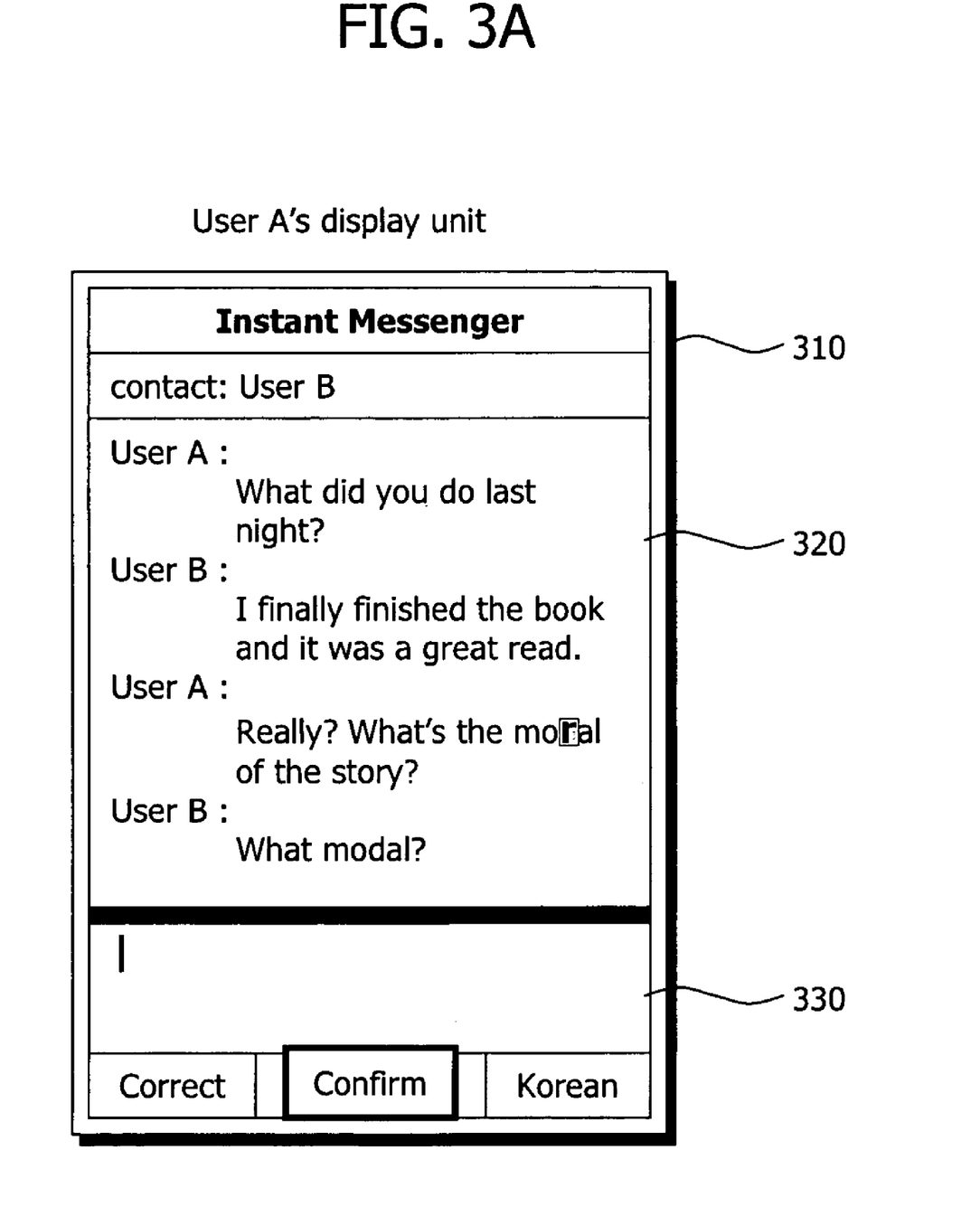
FIGS. 3A and 3B are views showing a usage screen of an enhanced instant messaging service in a mobile terminal, in accordance with one embodiment.
Figure 3B:
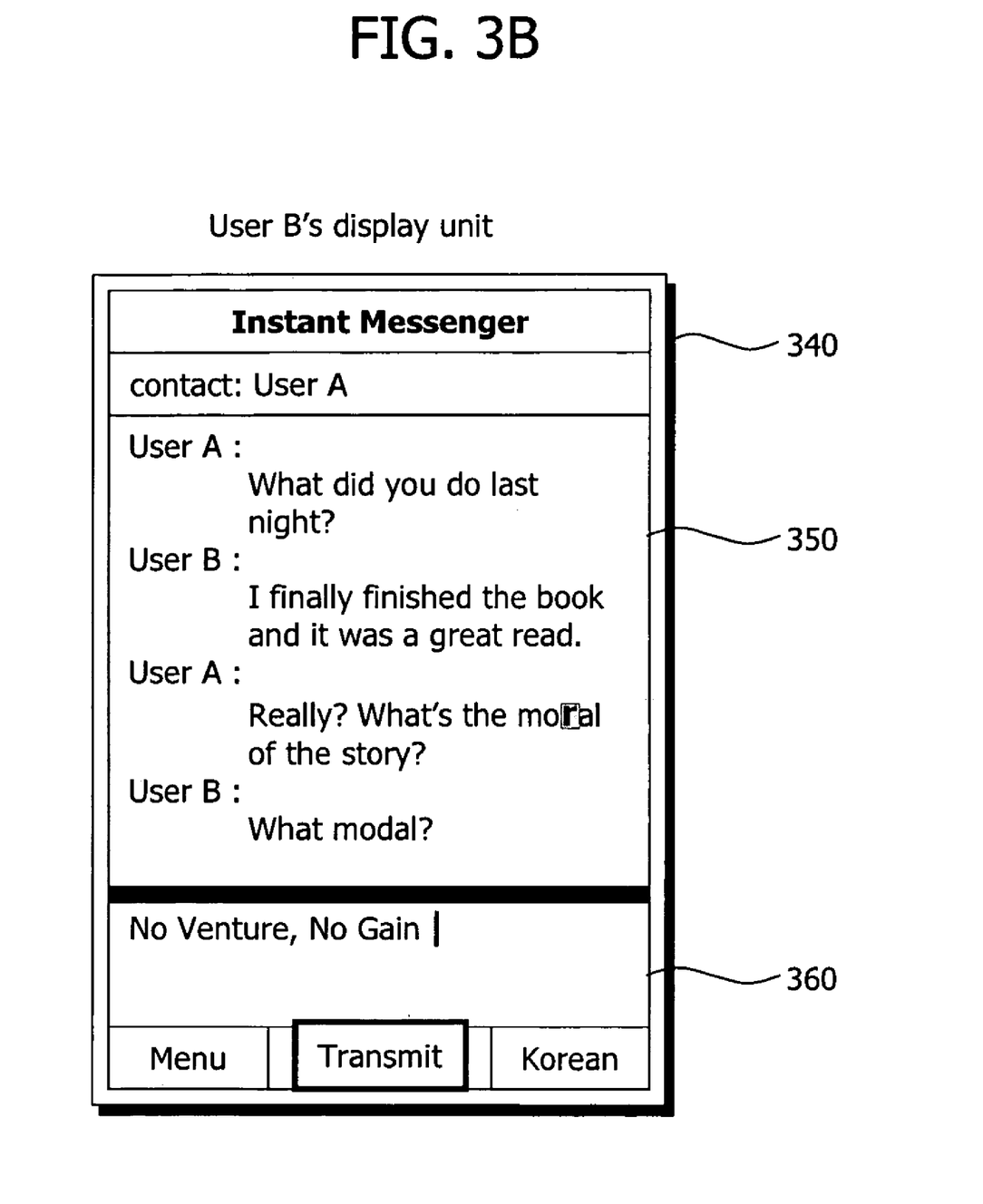

FIG. 3A shows a user A's usage screen 310 and FIG. 3B shows a user B's usage screen 340, in accordance with a preferred embodiment.

With reference to FIGS. 3A and 3B, while using the instant messenger, the user A inputted "What's the modal of the story?", and transmitted the inputted contents. In case the user B did not understand what the user A said, the user A corrects the portion where a typing error exits directly in a viewing window 320.

In one embodiment, the display unit of the mobile terminal is touch sensitive, such that a user can interact with the screen by touching a location on the display where the text to be corrected is present. Thus, a manual touching of the display will trigger a change of focus from the edit window 330 to the viewing window 320.

In another embodiment, a user may interact with a pointing device, such as a designated key, joystick, graphic menu interface, or a keypad of the mobile terminal to select the text that is to be corrected. For example, as shown in FIG. 3A, a "correct" button may be pressed by the user in order to switch from the input window 330 to the viewing window 320. In yet another embodiment, typing a special character (e.g., "#", "*", etc.) in the input window 330 may result in change of focus to the viewing window 320.

After the point of focus is switched from the input window 330 to the viewing window 320, the user may navigate a cursor through the viewing window 320 (e.g., by way of interacting with a touch pad screen, arrow keys, pointing device, etc.) to select a portion of a text that is to be changed. Once the selection is made, the user may change the selected portion of the text by entering new data. Thereafter, the user may interact with the mobile terminal (e.g., by pressing a "confirm key" as shown) to enter the new data.

In this manner, the user can change a selected portion of the message in the viewing window 320, instead of writing the entire message again in the input window 330. Accordingly, the error in the previously sent message is corrected without the need to reenter the message again, and the corrected content is also displayed on the user B's viewing window 350 as soon as the correction is made.

In a first preferred embodiment, the updated or corrected area is visually enhanced (e.g., highlighted, colored, bolded, reformatted, etc.) so that it is easily recognizable from other text which is not updated or corrected. In order to display the corrected message on user B's screen, the corresponding information or attributes for visually enhancing the corrected area are transmitted to user B's mobile terminal. In order to accomplish this, the information or attributes associated with the updated contents is included in a data packet, an exemplary embodiment of which is illustrated in FIG. 4.

Figure 4:
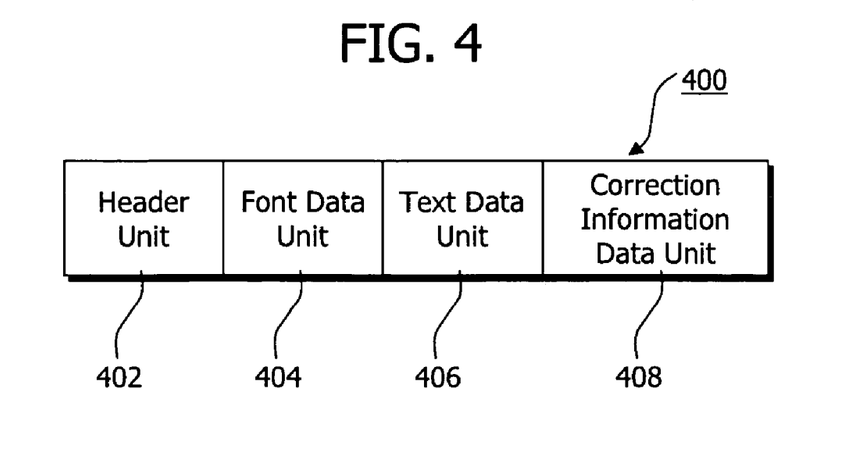
FIG. 4 illustrates an exemplary structure of a data packet for an enhanced instant messaging service in accordance with one embodiment.

As shown in FIG. 4, an exemplary data packet 400 for the enhanced instant messaging service in accordance with one embodiment comprises a header unit 402, font data unit 404, text data unit 406 and correction information data unit 408, for example. In accordance with one aspect of the invention, header unit 402 is associated with information identifying the packet as a text messaging or content update packet, for example. The font data unit 404 is associated with information indicating attributes of displayed data such as font sizes, font types, etc. The text data unit 406 is associated with data of text inputted or updated by a user and a correction information data unit 408 is associated with information about the location of correction in the displayed message.

The correction information data unit 408 refers to information indicating, for example, that a letter was corrected and also providing the location of the corrected letter in the message (e.g., the corrected letter is located in the $n^{th}$ byte within the $n^{th}$ message, or the corrected letter is located in the $n^{th}$ byte from the end of the $n^{th}$ message).

Thus, for example, correction information data unit may comprise information indicating that the $24^{th}$ byte from the beginning of the last instant message (representing the location of letter "d" in "modal") should be updated. Depending on implementation, the update location may be calculated from the beginning, middle or end of a message, or in accordance with other location identifying algorithms.

In some embodiments, the correction information data unit 408 may comprise references to portion of user B's display (e.g., pixels) associated with the update information included in the text data unit 406. The text data unit 406 refers to data of a text which is directly corrected or updated. For example, referring to FIGS. 3A and 3B, the text data unit 406 refers to information about the letter 'r' replacing letter 'd' in the 'modal'.

If a packet is transmitted to the other party's terminal by correcting the message in one user's mobile terminal, the other party's terminal properly corrects the corresponding text in the viewing window by determining which text is corrected. This is accomplished based on information in the correction information data unit 408.

As briefly suggested earlier, in one embodiment, the font data unit 404 provides information about how the $n^{th}$ text within the $n^{th}$ message, for example, is corrected based on attribute information included in the text data unit 406. For example, the font size and type can be determined by processing information from the font data unit 404. The other party's terminal may be a mobile terminal, a personal computer, or other computing system capable of sending and receiving messages over an instant messaging service.

Figure 5:
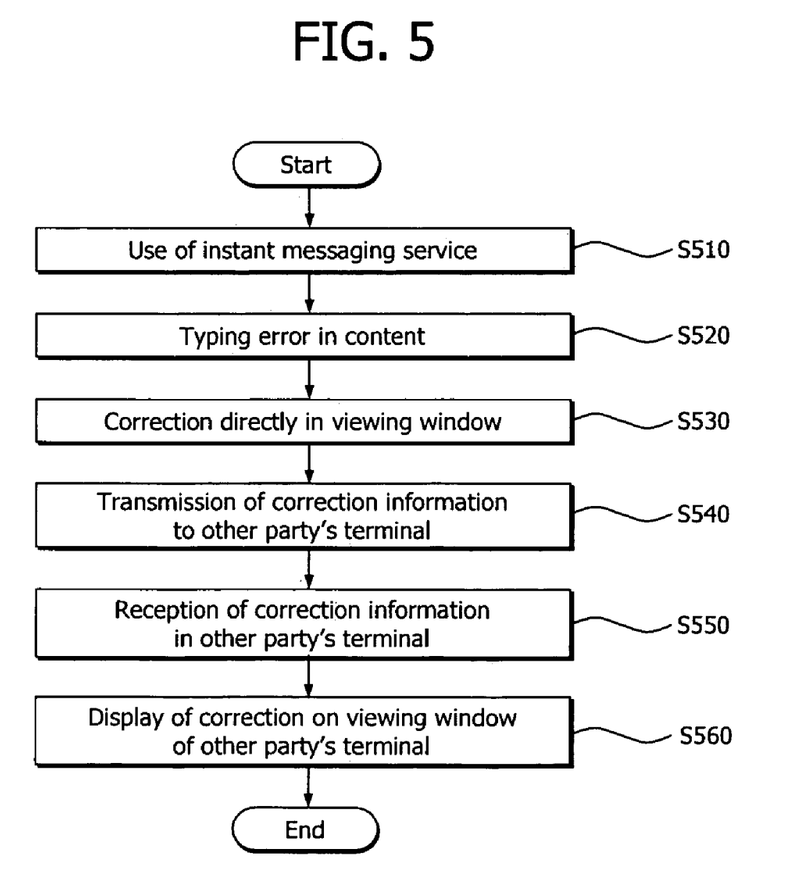
FIG. 5 is a flowchart of a method for enhancing instant messaging service in the mobile terminal in accordance with a first preferred embodiment.

FIG. 5 is a flowchart showing a method for enhancing instant messaging service in a mobile terminal in accordance with one embodiment. With reference to FIG. 5, a user uses an instant messaging service through a first mobile terminal to generate content for delivery to a second mobile terminal (S510).

In an exemplary scenario, a typing error is present in the content (S520) and the user directly corrects the error in the message in a viewing window 350 (S530). The related correction or update information is transmitted to the second mobile terminal (S540), in accordance with a preferred embodiment.

The second mobile terminal receives the correction information (S550). Accordingly, a text of the corresponding message in the viewing window 350 of the second mobile terminal is corrected and displayed (S560).

In an exemplary embodiment, in addition to displaying the corrected text in an enhanced visual format, a user notification message such as "communications are corrected" or "message is corrected" can be displayed on a display unit or audibly outputted as voice or a specific sound through a voice output unit such as a speaker.

Figure 6:
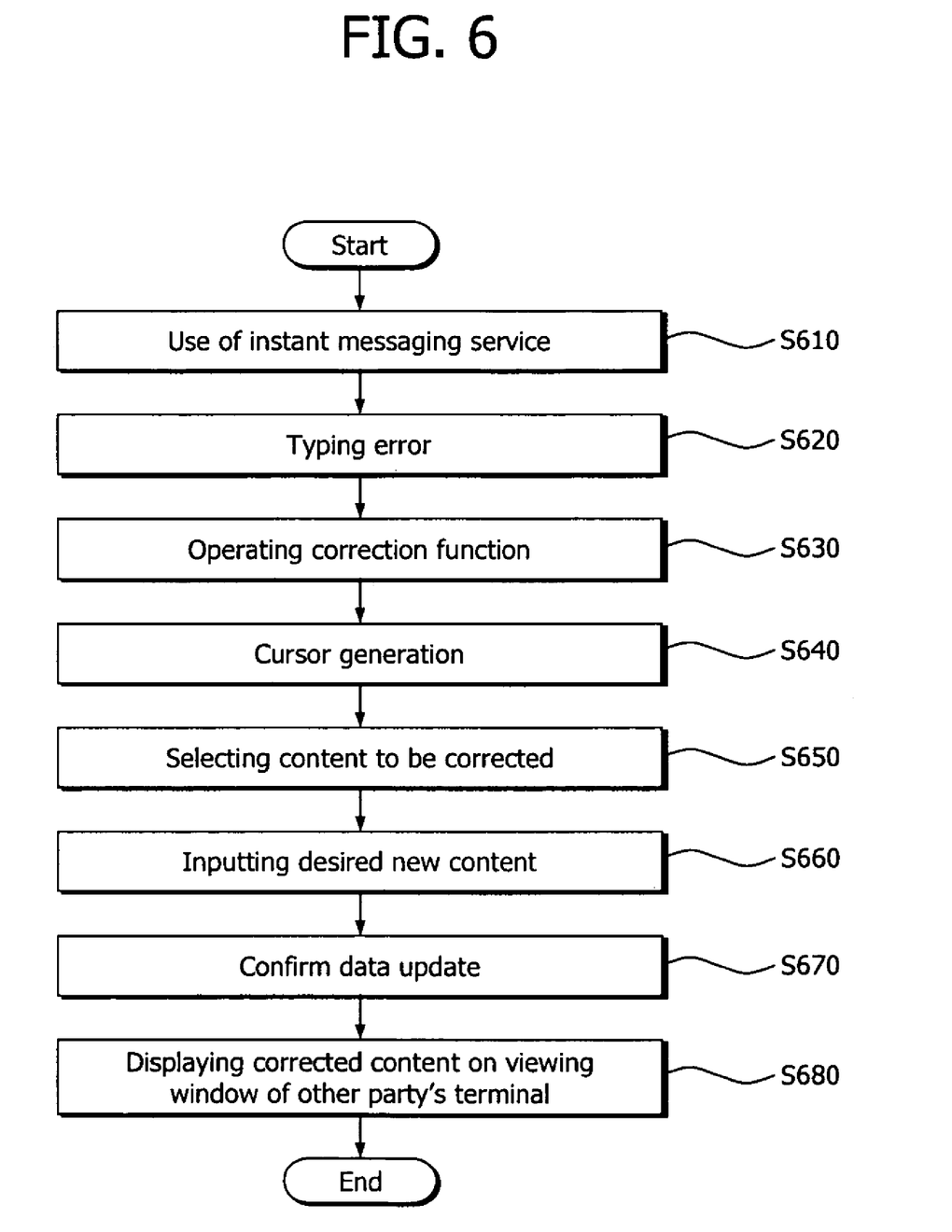
FIG. 6 is a flowchart of a method for enhancing an instant messaging service in the mobile terminal in accordance with a second preferred embodiment.

FIG. 6 is a flowchart illustrating a second preferred method for enhancing instant messaging service in the mobile terminal. With reference to FIG. 6, when a user using a first mobile terminal (i.e., transmitting terminal) communicates with another user using a second mobile terminal (i.e., a receiving terminal) over an instant messaging service (S610), if a transmitted message needs to be corrected due to a typing error for example (S620), the user operates a correction function through a menu operation or otherwise interacts with the mobile terminal, by for example pressing a key to which a correction function is allocated (S630).

As provided above, the correction function, in one embodiment, switches the point of focus from the input window 360 to the viewing window 350. When the correction function is activated by the user, a cursor for selecting a portion of a the displayed text is generated (S640). The user then interacts with the first mobile terminal to select content to be corrected or updated (S650) and inputs desired new letter or words (S660).

When the inputting of the desired new letter or words is completed, the user checks and transmits updated data including information on the correction by pressing a confirmation button or interacting with a user graphic interface menu (S670), for example. The second terminal having received the update data analyzes the data, corrects the corresponding letter or words on the screen and displays corrected contents in preferably an enhanced format (e.g., bold or different color) to be easily recognized (S680).

As so far described, the method for enhancing instant messaging service in the mobile terminal in accordance with the present invention can improve user convenience by directly inputting and correcting a text where a previous typing error exits without the need to write a new message in which the user corrects the typing error.

In addition, charges levied upon the user can be reduced by transmitting not a new message but a packet containing information limited to the corrected text. In a system, where the user account is charged based on the volume of data transmitted, this can be more cost effective, since a smaller data packet will be generated.

Figure 7:
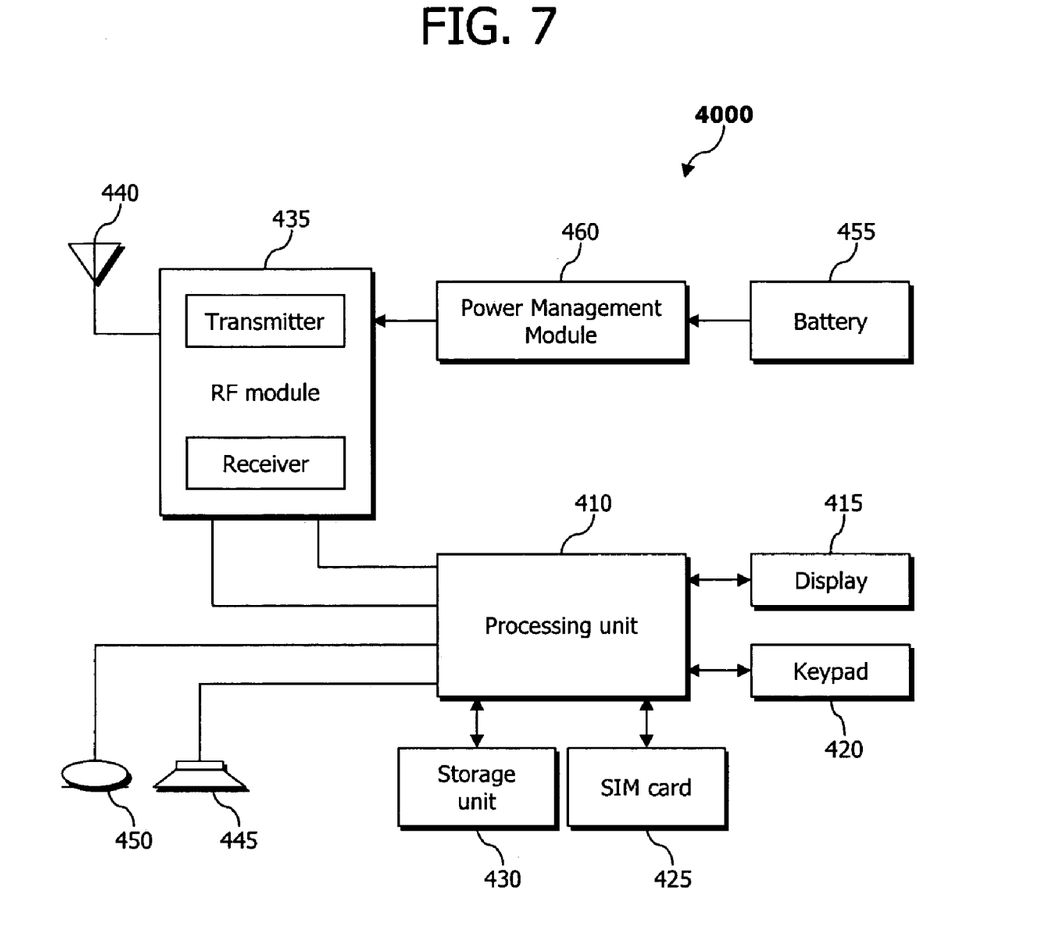
FIG. 7 is a block diagram of an exemplary mobile terminal in accordance with one embodiment.

Referring to FIG. 7, a block diagram of an exemplary embodiment of a mobile terminal 4000, in accordance with one embodiment, is illustrated. The mobile terminal 4000 comprises a processing unit 410 such as a microprocessor or digital signal processor, an RF module 435, a power management module 460, an antenna 440, a battery 455, a display 415, a keypad 420, a storage unit 430 such as flash memory, ROM or SRAM, a speaker 445 and a microphone 450.

A user enters instructional information (e.g., instant message) by pushing the buttons of a keypad 420 or by voice activation using the microphone 450. The processing unit 410 receives and processes the instructional information to perform the appropriate function. Operational data may be retrieved from the storage unit 430 to perform the function. Furthermore, the processing unit 410 may display the instructional and operational information on the display 415 for the user's reference and convenience.

The processing unit 410 issues instructional information to the RF module 435 to initiate communication (e.g., transmit radio signals comprising voice communication data). The RF module 435 comprises a receiver and a transmitter to receive and transmit radio signals, respectively. The antenna 440 facilitates the transmission and reception of radio signals. Upon receiving radio signals, the RF module 435 may forward and convert the signals to baseband frequency for processing by the processing unit 410. The processed signals would be transformed into audible or readable information outputted via the speaker 450, for example.

The processing unit 410 is adapted to store message history data of messages received from and messages transmitted to other users in the storage unit 430, receive a conditional request for message history data input by the user, process the conditional request to read message history data corresponding to the conditional request from the storage unit, and output the message history data to the display unit 415. The storage unit 430 is adapted to store message history data of the received messages and the transmitted messages.

Figure 8:
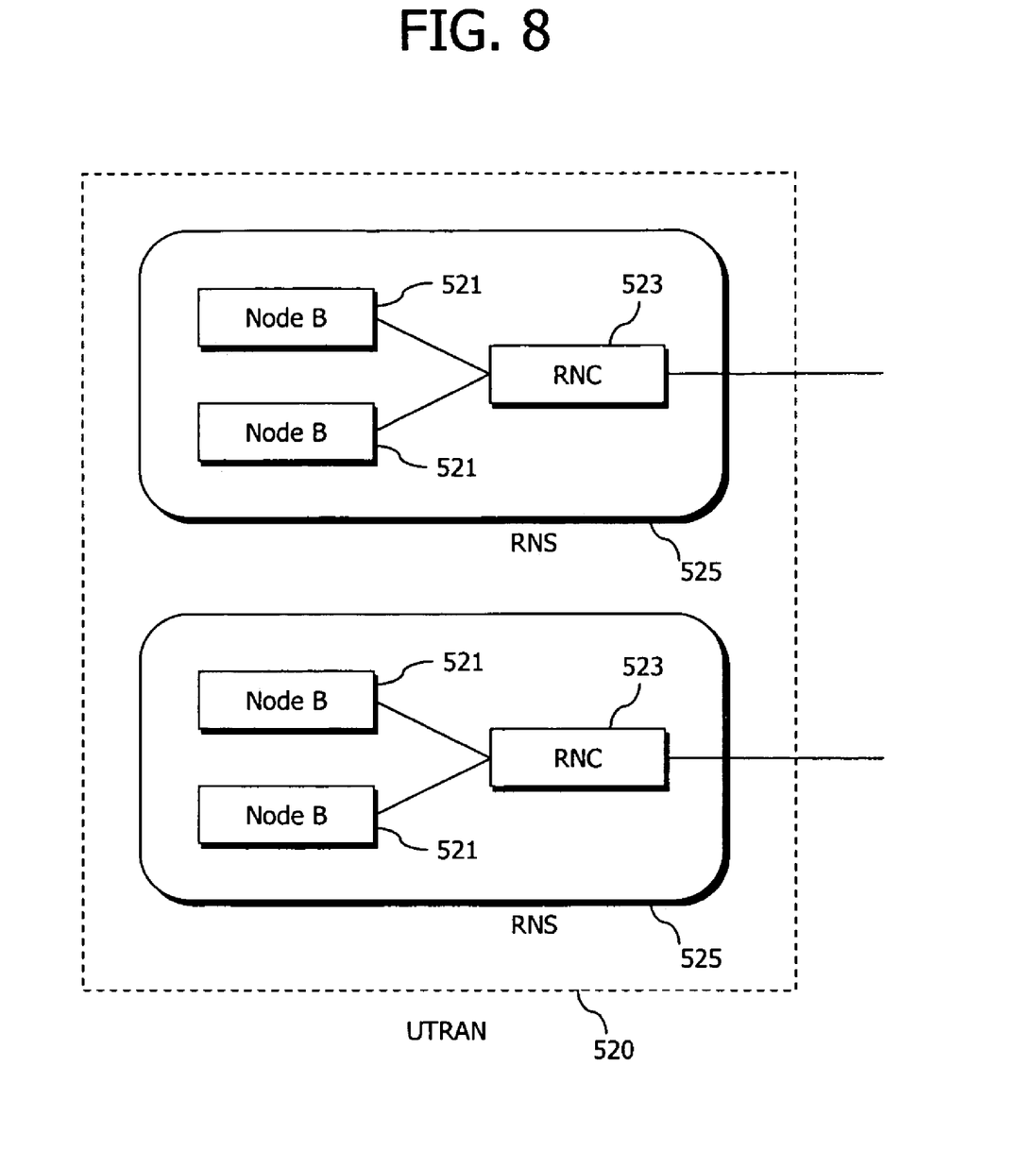
FIG. 8 is a block diagram of an exemplary mobile communication network in which the mobile terminal operates.

FIG. 8 illustrates a block diagram of a mobile communication network having a UTRAN 520 according to a preferred embodiment. The UTRAN 520 comprises one or more radio network sub-systems (RNS) 525. Each RNS 525 comprises a radio network controller (RNC) 523 and a plurality of Node-Bs (base stations) 521 managed by the RNC. The RNC 523 handles the assignment and management of radio resources (e.g., authorizing talk burst requests) and operates as an access point with respect to the core network. Furthermore, the RNC 523 is adapted to perform the methods of the present invention.

The Node-Bs 521 receive information sent by the physical layer of the terminal 4000 through an uplink, and transmit data to the terminal through a downlink. The Node-Bs 521 operate as access points, or as a transmitter and receiver, of the UTRAN 520 for the terminal 4000.

Although the present invention is described in the context of a mobile communication device, the present invention may also be used in any wired or wireless communication systems using mobile devices, such as PDAs and laptop computers. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

Preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium, hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for correcting text message displayed on terminals communicating over an instant messaging communication network, the method comprising:
   inputting a text message in a viewing window of a first terminal;
   transmitting a first packet having the inputted text message to a second terminal by way of an instant messaging communication;
   correcting a corresponding letter in the text message, using the first terminal, in response to recognizing a typing error in the text message transferred to the second terminal over the instant messaging communication; and
   transmitting from the first terminal to the second terminal a second packet comprising information related to the corrected letter, so that the text message displayed in a viewing window of the second terminal is updated with the corrected letter,
   wherein the second packet comprises information related to the corrected letter excluding other content of the text message;
   wherein the corrected letter is displayed in a specific way different from displaying of non-corrected letters in the text message based on the information related to the corrected letter; and
   wherein the specific way includes making the corresponding text bold, colored, blinking and underlined.

2. The method of claim 1, wherein correcting the corresponding letter comprises:
   selecting an erroneous letter using a cursor in the viewing window; and
   correcting the erroneous letter according to the user's input and displaying the corrected letter on both the first terminal and the second terminal.

3. The method of claim 1, wherein the information comprises:
   a header unit indicating information for a packet;
   a font data unit indicating information on attributes of the letter corrected by the user;
   a text data unit indicating the letter corrected by the user; and
   a correction information data unit indicating information related to a location of the corrected letter.

4. The method of claim 3, wherein the information related to the location of the corrected letter is provided in form of $n^{th}$ byte within the text message or $n^{th}$ byte from the end of the text message.

5. A method for correcting a text message displayed on terminals communicating over in an instant messaging communication network, the method comprising:
   in responding to:
      a first terminal selecting an erroneous letter displayed in a viewing window, wherein the erroneous letter is in a location in the text message communicated between a user of the first terminal and a user of the second terminal;
      the first terminal correcting the erroneous letter; and
      the first terminal transmitting a packet containing information related to the corrected letter to the second terminal,
   receiving a packet from the first terminal; and
   correcting the previously transmitted text message based on information related to the corrected letter contained in the packet, wherein the packet contains only information related to the corrected letter wherein the corrected letter is displayed in a specific way different from displaying of non-corrected letters in the text message based on the information related to the corrected letter: and wherein the specific way includes making the corresponding text bold, colored, blinking and underlined.

6. The method of claim 5, wherein the information comprises:

a header unit indicating information for a packet;

a font data unit indicating information on attributes of the letter corrected by the user;

a text data unit indicating the letter corrected by the user; and a correction information data unit indicating information related to a location of the corrected letter.

7. The method of claim 6, wherein the information related to the location of the corrected letter is provided in form of $n^{th}$ byte within the text message or $n^{th}$ byte from the end of the text message.

8. A first mobile terminal comprising:

a screen for displaying a text message having an erroneous letter displayed in a viewing window, wherein the erroneous letter is in a location in the text message communicated between a user of the first mobile terminal and a user of the second terminal;

a user interface for correcting the erroneous letter in the text message of the viewing window;

a processor for forming a packet containing information related to the corrected letter; and a transmitter for transmitting the packet so that the text message displayed in a viewing window of the second terminal is corrected by the information related to the corrected letter, wherein the packet contains only information related to the corrected letter;

wherein the second terminal displays the corrected letter in a specific way different from displaying of non-corrected letters in the text message based on the information related to the corrected letter, and wherein the specific way includes making the corresponding text bold, colored, blinking and underlined.

9. The terminal of claim 8, wherein the information comprises:

a header unit indicating information for a packet;

a font data unit indicating information on attributes of the letter corrected by the user;

a text data unit indicating the letter corrected by the user; and a correction information data unit indicating information related to a location of the corrected letter.

10. The terminal of claim 9, wherein the information related to the location of the corrected letter is provided in form of $n^{th}$ byte within text message or $n^{th}$ byte from the end of the text message.

* * * * *